United States Patent
Revach et al.

(10) Patent No.: US 10,754,894 B2
(45) Date of Patent: Aug. 25, 2020

(54) ORDERING REGULAR EXPRESSIONS

(71) Applicant: HEWLETT PACKARD ENTERPRISE DEVELOPMENT LP, Houston, TX (US)

(72) Inventors: Eli Revach, Yehud (IL); Amitai Shlomo Shtossel, Yehud (IL); Fernando Vizer, Yehud (IL)

(73) Assignee: MICRO FOCUS LLC, Santa Clara, CA (US)

(*) Notice: Subject to any disclaimer, the term of this patent is extended or adjusted under 35 U.S.C. 154(b) by 629 days.

(21) Appl. No.: 15/388,184

(22) Filed: Dec. 22, 2016

(65) Prior Publication Data
US 2018/0181680 A1 Jun. 28, 2018

(51) Int. Cl.
| | |
|---|---|
| G06F 16/903 | (2019.01) |
| G06N 5/02 | (2006.01) |
| G06F 16/35 | (2019.01) |
| G06F 16/901 | (2019.01) |

(52) U.S. Cl.
CPC ....... *G06F 16/90348* (2019.01); *G06N 5/022* (2013.01); *G06F 16/35* (2019.01); *G06F 16/9024* (2019.01)

(58) Field of Classification Search
CPC . G06F 16/90348; G06F 16/35; G06F 16/9024
See application file for complete search history.

(56) References Cited

U.S. PATENT DOCUMENTS

| | | | |
|---|---|---|---|
| 7,185,081 B1* | 2/2007 | Liao | H04L 47/2441 709/224 |
| 7,308,446 B1* | 12/2007 | Panigrahy | G06F 16/90344 |
| 7,343,604 B2 | 3/2008 | Grabarnik et al. | |
| 7,577,633 B2 | 8/2009 | Shankar et al. | |
| 7,653,633 B2 | 1/2010 | Villela et al. | |
| 8,079,081 B1 | 12/2011 | Lavrik et al. | |
| 2002/0091512 A1* | 7/2002 | Karttunen | G10L 15/193 704/202 |

(Continued)

OTHER PUBLICATIONS

Botond Botyanszki, "NXLOG Community Edition Reference Manual for v2.8.1248," Dec. 15, 2009, pp. 1-112, Available at: <nxlog.co/documentation/nxlog-community-edition-reference-manual-v20928#config_route_priority>.

(Continued)

*Primary Examiner* — Jensen Hu

(57) ABSTRACT

In examples, an apparatus comprises: a memory, and a processor coupled to the memory. The processor to: adaptively order an ordered set of regular expressions based on training messages to produce a set of adaptively ordered regular expressions having an adaptive order, determine a first of the adaptively ordered regular expressions that matches an additional message, and determine whether a second of the adaptively ordered regular expressions matches the additional message. Responsive to determining that the second of the other of the adaptively ordered regular expressions matches the additional message, the processor to: classify the additional message with the first regular expression if the first regular expression has a higher priority in the adaptive order; and classify the additional message with the second regular expression if the second regular expression has a higher priority in the adaptive order.

18 Claims, 7 Drawing Sheets

(56) References Cited

U.S. PATENT DOCUMENTS

| | | | |
|---|---|---|---|
| 2007/0226362 A1* | 9/2007 | Johnson | H04L 43/18 709/230 |
| 2011/0093496 A1* | 4/2011 | Bando | G06F 16/90344 707/769 |
| 2012/0204260 A1* | 8/2012 | Cecil | G06F 21/554 726/22 |
| 2012/0221494 A1* | 8/2012 | Pasetto | G06N 5/00 706/12 |
| 2014/0282031 A1* | 9/2014 | Hinterbichler | G06F 11/3656 715/738 |
| 2014/0310290 A1 | 10/2014 | Huang et al. | |
| 2015/0324457 A1* | 11/2015 | McLean | G06F 16/90344 707/758 |
| 2016/0092557 A1* | 3/2016 | Stojanovic | G06Q 30/02 707/723 |
| 2017/0142274 A1* | 5/2017 | Koyanagi | G06K 9/00456 |
| 2017/0220836 A1* | 8/2017 | Phillips | G06K 9/001 |

OTHER PUBLICATIONS

Laptev et al., Optimizing Regular Expression Clustering for Massive Pattern Search, 2012 (13 pages).

* cited by examiner

ORDERING REGULAR EXPRESSIONS

BACKGROUND

A regular expression is a sequence of characters that define a search pattern. A string searching algorithm may process the regular expression to match the pattern against strings of text.

BRIEF DESCRIPTION OF THE DRAWINGS

The following detailed description references the drawings, wherein.

DETAILED DESCRIPTION

Figure 1:
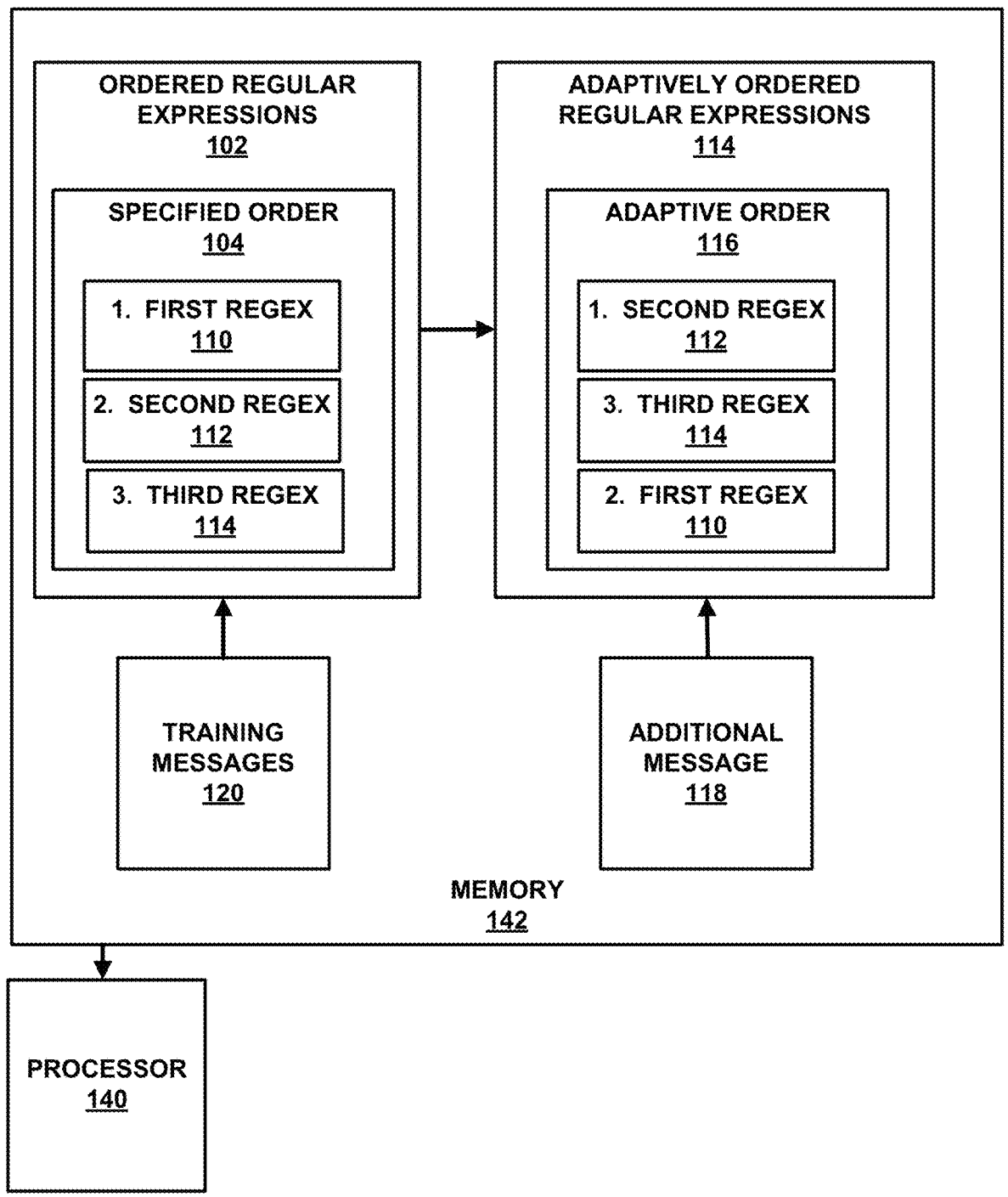
FIG. 1 is a block diagram of an example computing system for ordering regular expressions.

A regular expression is a sequence of characters that defines a pattern. A string matching algorithm determines strings that match the pattern defined by the regular expression. A user, such a system administrator or programmer may define regular expressions to find strings that match the defined pattern. A regular expression parser may compile the regular expressions to improve string matching performance.

One particular application of regular expressions is the parsing of server log data. Severs may generate large amounts of log data. The log data may comprise numerous messages that are stored in a log file or a stream. A user may define rules using regular expressions to classify the log data into categories.

For example, expressions matching a first regular expression may be classified as an "error" message. Expressions matching a second regular expression may be classified into a different category, such as being related to a database.

Currently, a user or systems administrator may specify an ordered list of regular expressions for a processor to use when classifying log messages. A processor executes the regular expressions in order until a regular expressions found that matches the log message. Once a matching regular expression is found, the processor begins checking the next log message against the first regular expression, and so on.

Because a user specifies an ordering of regular expressions that the processor obeys, the processor does not consider the frequency with which certain regular expressions occur relative to each other. In various examples, more frequently occurring message types may be classified with a regular expression that has a lower priority relative to lower frequency regular expressions that have a higher priority in the user-defined order. In such examples, the processor checks each of the higher priority but lower frequency regular expressions before eventually matching the more frequently matching, but lower priority message.

This disclosure proposes to adaptively reorder the regular expressions used for classifying log messages. The regular expressions are adaptively reordered based on frequency of occurrence, such that most-frequently occurring regular expressions are checked against a message first.

The danger with adaptively reordering the regular expressions out of the user-specified order is that messages may be misclassified. To reduce the amount of misclassification, the processor analyzes the classified messages determine whether any messages were misclassified with the wrong regular expressions.

The processor creates a bi-directional graph comprising nodes corresponding to each of the regular expressions. As messages are matched against the regular expressions, a processor determines which, if any expressions match a same message. The processor connects the nodes corresponding to the also-matching regular expressions, with edges.

Once the bi-directional graph has been created and nodes corresponding to the regular expressions have been connected with edges, the processor may parse other messages and may traverse the graph to correct for errors. More particularly, for each message, the processor determines a matching regular expression by checking the regular expressions in the adaptive order. The processor also determines a first node of the graph that corresponds to the matching regular expression.

Next, the processor traverses the edges of the graph to reach the connected nodes of the graph that correspond to regular expressions that previously matched the same message. The processor checks the nodes connected to the first node to determine whether any of the matching regular expressions have a higher priority in the user-specified order than the regular expression that initially matched the message. If the higher-priority message regular expression matches the message, the processor re-classifies the messages with the higher-priority regular expression.

FIG. 1 is a block diagram of an example computing system for ordering regular expressions. Computing system 100 comprises memory 142 and processor 140. Processor 140 may comprise at least one of a central processing unit (CPU), graphics processing unit (GPU), application-specific integrated circuit (ASIC), field programmable gate array (FPGA), or the like. Processor 140 may execute a regular expression parser. The regular expression parser may parse log data from a file or stream of a computing device.

Memory 142 may comprise random access memory (RAM), static RAM (SRAM), non-volatile memory, flash memory, disk-based storage, network based storage, or any combination thereof. Processor 140 is coupled to memory 142. Memory 142 may store ordered regular expressions (Regexes) 102. Ordered regular expression 102 may be a list of regular expression defined by a user, such as a systems administrator (sysadmin) in various examples.

Ordered regular expressions 102 may be stored in a file, and have a specified order 104. Processor 140 may execute a processor to parse ordered regular expressions 102. In various examples, the processor may compile the regular expressions for faster execution. Processor 140 may compare messages, such as training messages 120 against each of the regular expressions in specified order 104 until a match is found. Once processor 104 finds a matching regular expression, processor 140 classifies the message based on the matched regular expression, and attempts to match the a next message of training messages 120, again beginning with the first regular expression in specified order 104.

An example of matching a message against ordered regular expressions 104 will now be described. In this example, processor 140 attempts to match a first message against ordered regular expressions 102 in specified order 104. In this example, first regex 110 is a first regex that is ordered first in specified order 104. Processor 140 determines whether the message matches first regex 110. If processor 140 determines that first regex 110 matches the message, processor 140 classifies the message based on first regex 110, stops attempting to match the message against ordered regular expressions 102, and moves on to the next regular expression.

If processor 140 determines that first regex 110 does not match the message, processor 140 attempts to match the message against the next regex in specified order 104 until a matching regex is found. In the example of FIG. 1, the next regex after first regex 110 is second regex 112, which processor 140 attempts to match with message 140. Third in the priority of specified order 104 is third regex 114. If third regex 114 does not match the message, processor 140 may continue to check additional regular expressions in specified order 104 (not pictured) until a matching regular expression is found. Responsive to finding a matching regular expression, processor 140 classifies the message based on the matching regular expression.

An issue with matching a message against ordered regular expression 102 is that specified order 104 is frequently not in an optimized order for most quickly determining which of ordered regular expressions 102 matches a message. The techniques of this disclosure improve message classification speed by adaptively reordering the regular expressions based on the matching frequency of each of the regular expressions such that most-frequently matching regular expressions are checked earlier in the regular expression checking order than less-frequently matching regular expressions.

More particularly, processor 140 receives a set of training messages 120. Processor 140 may calculate a histogram based on the matching frequency of each of ordered regular expressions 102. Processor 140 determines a corresponding frequency value for each regex of ordered regular expressions 102. Processor 140 increments a value each time a regular expression matches one of training messages 120.

Responsive to determining frequency values for each message, processor 140 reorders ordered regular expressions 102 into adaptive order 116 based on the frequency values such that most frequently matching to least frequently matching regular expressions. In the example of FIG. 1, second regex 112 has a higher matching frequency than first regex 112 and therefore has a higher priority in adaptive order 116 than first regex 112. Third regex 114 has a higher priority in adaptive order 116 than third regex 114 and first regex 110.

Responsive to processor 140 determining adaptive order 116, processor 140 may classify additional messages using adaptive order 116. By using adaptive order 116 rather than specified order 104, processor 140 may more quickly classify messages, such as additional message 118.

Responsive to determining adaptive order 116, processor 140 constructs a bi-directional graph, as will be discussed in greater detail herein. When classifying additional messages, such as additional message 118, processor 140 determines a matching regular expression from adaptive order 116, and then may traverse the bi-directional graph to determine whether additional message 118 has been misclassified. Processor 140 reclassifies the message if processor 140 determines the message has been misclassified.

In the example of FIG. 1, processor 140 attempts to classify additional message 118 using adaptively ordered regular expressions 114, which have an adaptive order 116. In adaptive order 116, second regex 112 has a higher priority than third regex 114. Third regex 114 has a higher priority than first regex 110. Thus, processor 140 determines whether second regex 110 matches additional message 118. If second regex 112 does not match additional message 118, processor 140 attempts to match additional message 118 against third regex 114, followed by first regex 112.

Figure 2:
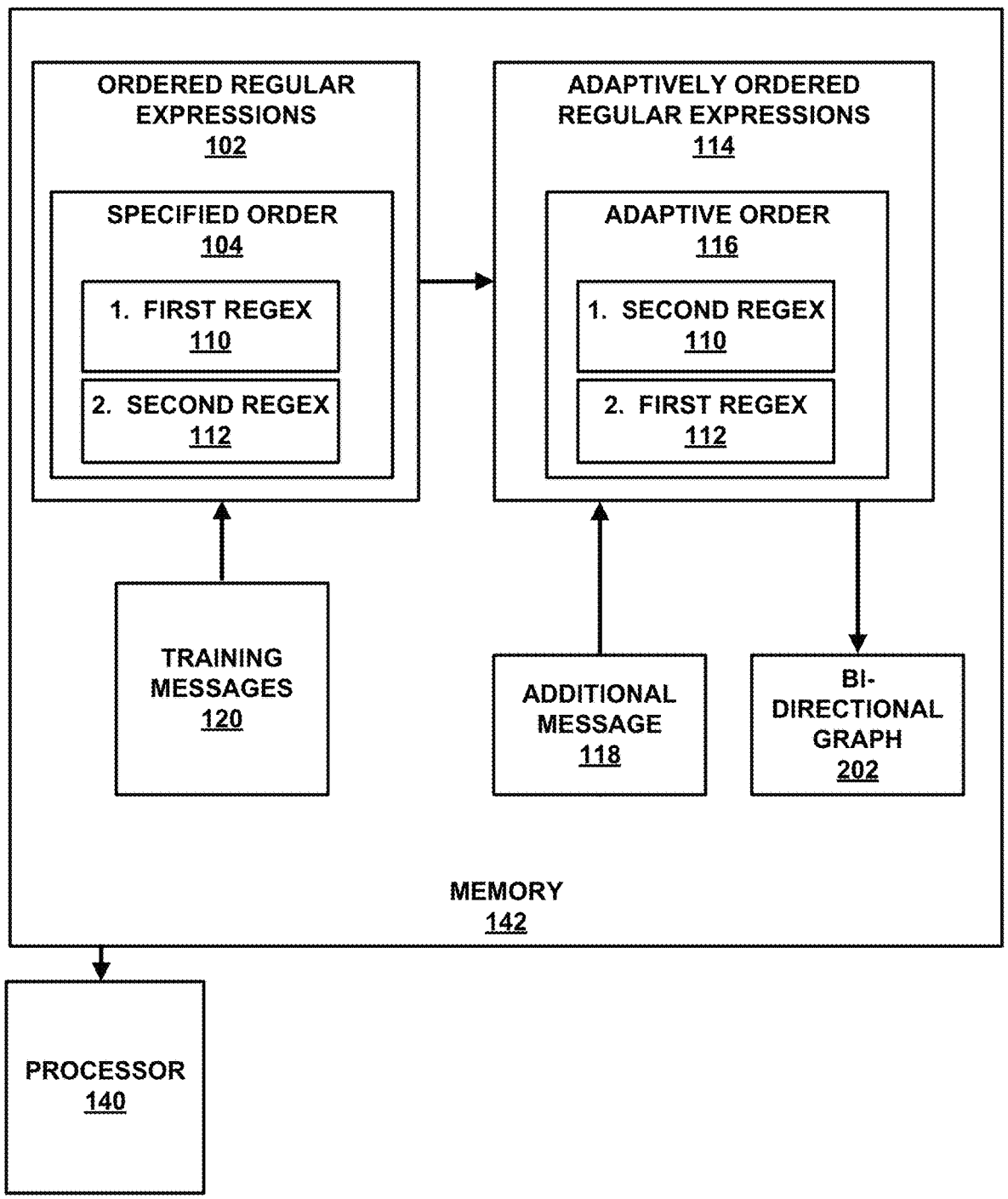
FIG. 2 is a block diagram of another example computing system for invoking singular value decomposition on a data set.

FIG. 2 is a block diagram of an example computing system for invoking singular value decomposition on a data set. FIG. 2 illustrates a computing system 200. Computing system 200 may be similar to computing system 100 of FIG. 1. In addition to the features described with respect to FIG. 1, system 200 also comprises bi-directional graph 202.

As described with respect to FIG. 1, processor 140 receives training messages 120 and determines a frequency that each of ordered regular expressions 102 match each of training messages 120. Based on the determined frequency, processor 140 generates adaptively ordered regular expressions 114.

In the example of FIG. 2, processor 140 also generate bi-directional graph 202. As described in greater detail herein, processor 140 generates bi-directional graph 202 by determining regular expressions that match a same message of training messages 120. Each node of bi-directional graph 202 corresponds to a regular expression of adaptively ordered regular expressions 114. Each node to which a first node is connected represents the regular expressions that matched a same message as the regular expression corresponding to the first node.

Responsive to generating bi-directional graph 202, processor 140 receives at least one additional message 118. Processor 140 checks adaptively ordered regular expressions 114 in adaptive order 116 until a matching regular expression is found. Responsive to determining a matching regular expression, processor 140 traverses bi-directional graph 202. Processor 140 traverses bi-directional graph 202 beginning at a first node corresponding to the regular expression that matches additional message 118. Processor 140 traverses bi-directional graph 202 to other nodes that are connected to the first node, and determines whether the regular expressions that correspond to the other nodes match additional message 118.

If any of the corresponding other regular expressions match additional message 118, processor 140 determines whether the other matching regular expression has a higher priority in specified order 104 than the first regular expression corresponding to the first node. If a higher priority regular expression matches additional message 118, then processor 140 classifies additional message 118 with the higher priority regular expression.

Figure 3A:
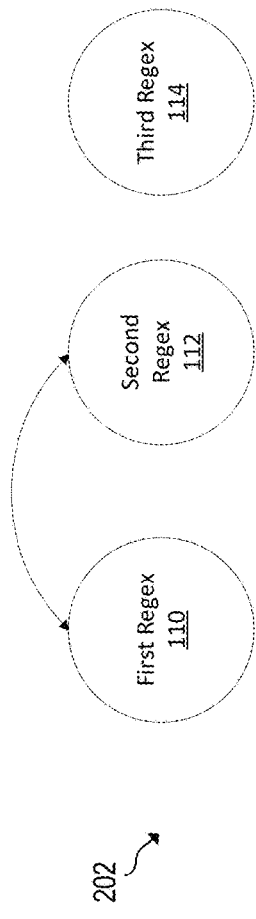
FIGS. 3A-3C are conceptual diagrams of example bi-directional graphs constructed based on regular expressions.

FIG. 3A is a conceptual diagram of an example bi-directional graph constructed based on regular expressions. A processor, such as processor 140 may construct bi-directional graph 202 based on training messages 120, as described herein.

In the example of FIG. 3A, processor 140 creates a nodes corresponding to each of the regular expressions in ordered regular expressions 102 and adaptively ordered regular expressions 114. Processor 140 then connects the nodes based on whether or not the corresponding regular expressions match a same one of training messages 120. Responsive to connecting the edges and nodes, processor 140 attempts to classify additional messages, such as additional message 118.

To traverse bi-directional graph 202, processor 140 begins at a first node corresponding to the regular expression that matches additional message 118, and visits nodes connected to the first node to determine whether other regular expression corresponding to the connected nodes also match additional message 118 and have a higher priority in specified order 104 than the matching regular expression.

In various examples, a user or program may limit a number of edges between nodes of bi-directional graph 202. Limiting the degree (i.e. the number of edges) of a node may limit the amount of traversal processor 140 is allowed to perform, thereby reducing computational complexity of the graph traversal. In some examples, a user or program may limit the amount of nodes that processor 140 may visit so as to limit the number of additional regular expressions processor 140 may attempt to match against an additional message.

In some examples, a user or program may specify a maximum allowable error rate for incorrectly classifying regular expressions. The allowable error rate may be based on the maximum number of edges or the maximum number of nodes that may be traversed. For example, if a 5% error rate is specified, the techniques of this disclosure may determine an observed error rate of classifying training messages 120 using adaptive order 116, and may add or remove edges until the observed error rate reaches the specified error rate. Additional examples regarding constructing and traversing an example bi-directional graph 202 will now be described in greater detail with respect to FIGS. 3A-3C.

In the example of FIG. 3A, processor 140 creates nodes corresponding to first regex 110, second regex 112, and a third regex 114. First regex 110, second regex 112, and third regex 114 may comprise ordered regular expressions 102 and adaptively ordered regular expressions 114 in various examples. Processor 140 may connect the nodes based on training messages 120.

More particularly, responsive to receiving training messages 120, processor 140 determines whether each of first regex 110, second regex 112, and third regex 114 match a same message of training messages 120. In an example corresponding to FIG. 3A, processor 140 determines that first regex 110 and second regex 112 match a same of training messages 120. To indicate that first regex 110 and second regex 112 match the same message, processor 140 connects first regex 110 and second regex 112 with an edge.

In a first example corresponding to FIG. 3A, if processor 140 determines that first regex 110 matches additional message 118, processor 140 traverses graph 202 from a first node corresponding to the matching first regular expression 110, to nodes connected to the first node, i.e. the node corresponding to second regex 112 in this example. In this example, even if second regex 112 matches additional message 118, second regex 112 has a lower priority than first regex 110 so processor 140 does not reclassify additional message 118.

In a second example corresponding to FIG. 3A in which additional message 118 matches third regex 114, the node corresponding to third regex 114 is not connected to any other nodes. Thus, third regex 114 remains classified with third regex 114 in this second example.

In a third example in which second regex 112 matches additional message 118, processor 140 traverses to the node corresponding to first regex 110. If first regex 110 matches additional message 118, processor 140 reclassifies additional message 118 based on first regex 118 because first regex 118 has a higher order in specified order 104.

Figure 3B:
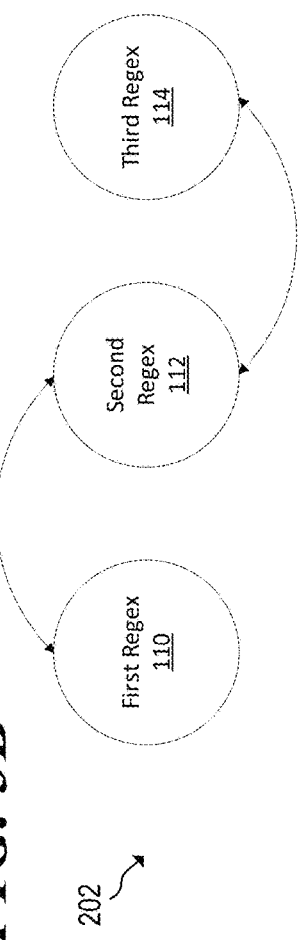

FIG. 3B is another conceptual diagram of an example bi-directional graph constructed based on regular expressions. In the example of FIG. 3B, processor 140 previously connected the nodes of bi-directional graph 202 corresponding to first regex 110 and second regex 112. In the example of FIG. 3B, processor 140 determines that second regex 112 and third regex 114 match a same message, and connects the nodes corresponding to second regex 112 and third regex 114 with an edge.

In a first example corresponding to FIG. 3B, processor 140 receives additional message 118, matches second regex 112. Based on the edges connecting the node corresponding to third regex 112 to the nodes corresponding to second regex 112 and first regex 110, processor 140 determines whether either first regex 110 or third regex match additional message 118. If either first regex 110 or third regex 114 match additional message 118, processor 140 determines whether either first regex 110 or third regex 114 have a higher priority in specified order 104 than third regex 114. In the examples of FIGS. 1 and 2, first regex 110 has a higher priority than second regex 110. Thus, in this example, processor 140 classifies additional message 118 with first regex 110 if both first regex 110 and second regex 112 match additional message 118, and with second regex 112 otherwise.

In a second example corresponding to FIG. 3B, processor 140 matches additional message with third regex 114. Processor 140 traverses the edge connecting second regex 112 and determines whether second regex 112 matches additional message 118. If second regex 112 matches additional message 118, processor 140 reclassifies additional message 118 based on second regex 112 because second regex 112 has a higher priority in specified order 104.

Figure 3C:
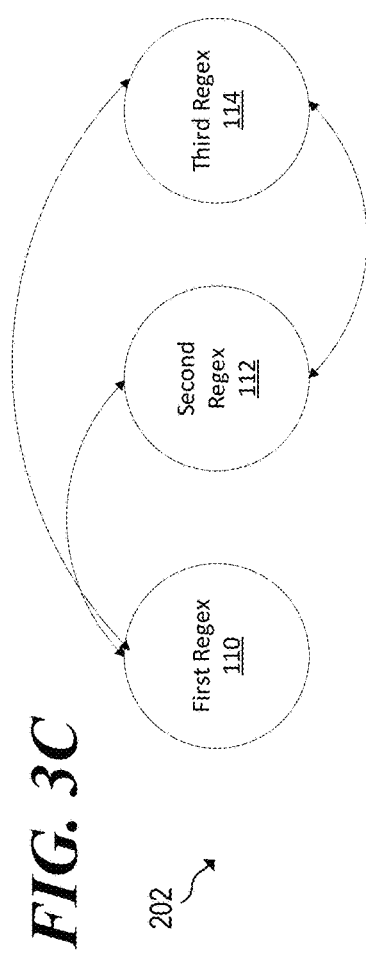

FIG. 3C is another example of a bi-directional graph constructed based on regular expressions. In the example of FIG. 3C, processor 140 previously connected the nodes of bi-directional graph 202 corresponding to first regex 110 and second regex 112. In the example of FIG. 3B, processor 140 determines that second regex 112 and third regex 114 match a same message, and connects the nodes corresponding to second regex 112 and third regex 114 with an edge.

As bi-directional graph 202 stands in FIG. 3C, processor 140 determines that first second regex 112 and third regex 114 match a same message of training messages 120. To indicate that first regex 110 and third regex 114 match the same message, processor 140 connects first regex 110 and third regex 114 with an edge.

In a first example, processor 140 receives additional message 118, which, in a first example, matches first regex 110. Based on the edges connecting the node corresponding to first regex 110 to the nodes corresponding to second regex 112 and third regex 114, processor 140 determines whether either second regex 112 or third regex 114 match additional message 118. If either second regex 112 or third regex 114 match additional message 118, processor 140 determines whether either second regex 112 or third regex 114 have a higher priority in specified order 104 than third regex 114. In the examples of FIGS. 1 and 2, first regex 110 has a higher priority than second regex 110 and third regex 114. Thus, in this example, processor 140 classifies additional message 118 with first regex 110.

In another example corresponding to FIG. 3B, processor 140 matches additional message with third regex 114. Processor 140 traverses the edge connecting the node corresponding to third regex 114 to second regex 112 and first regex 110 and determines whether second regex 112 or first regex 110 matches additional message 118. If second regex 112 and first regex 110 match additional message 118, processor 140 reclassifies additional message 118 based on first regex 110 because first regex 110 has a higher priority in specified order 104. If both third regex 114 and second regex 112 match additional message 118, processor 140 classifies additional message 118 based on second regex 112 because second regex 112 has a higher priority in specified order 104.

Figure 4:
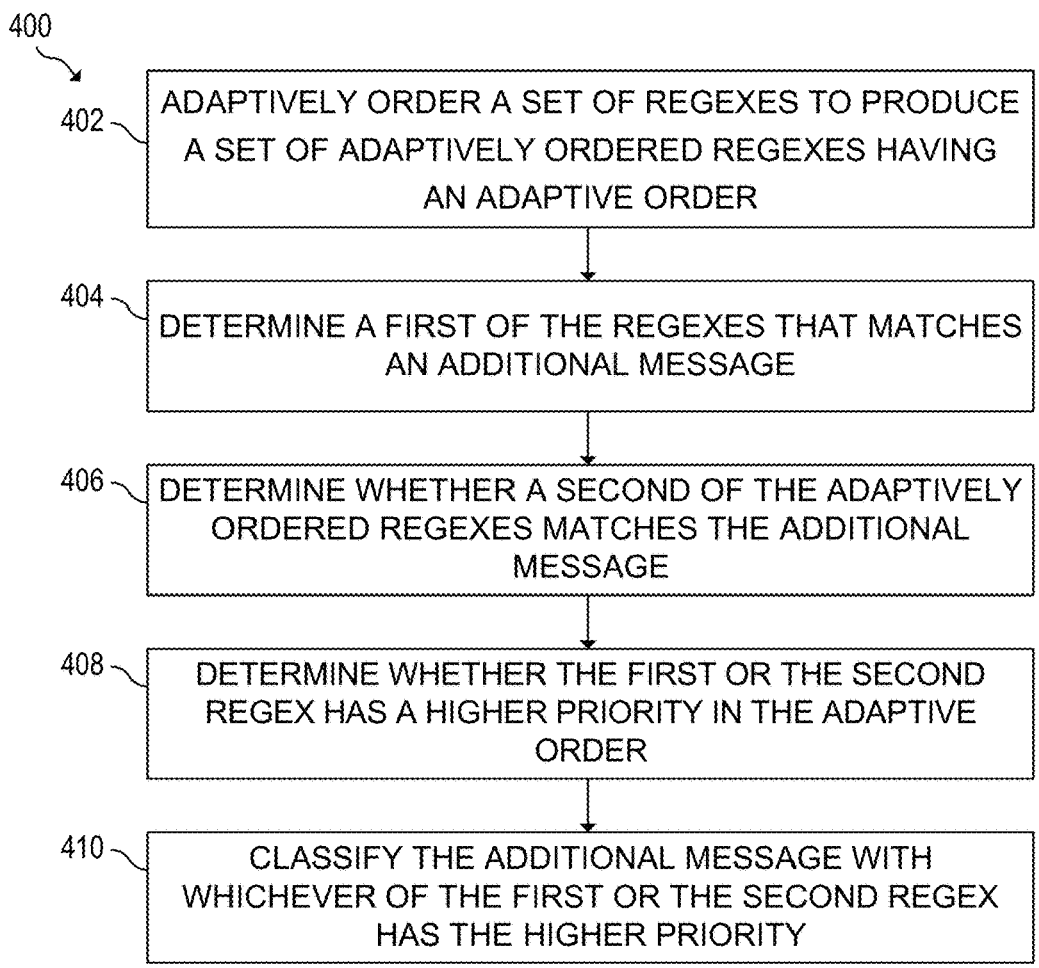
FIG. 4 is a flowchart of an example method for ordering regular expressions.

FIG. 4 is a flowchart of an example method for ordering regular expressions. Method 400 may be described below as being executed or performed by a system or device, for example, computing system 100 of FIG. 1 or computing system 200 of FIG. 2. Other suitable systems and/or computing devices may be used as well. Method 400 may be implemented in the form of executable instructions stored on at least one machine-readable storage medium of the system and executed by at least one processor (e.g. processor 140) of the system. Alternatively or in addition, method 400 may be implemented in the form of electronic circuitry (e.g., hardware). In alternate examples of the present disclosure, one or more blocks of method 400 may be executed substantially concurrently or in a different order than shown in FIG. 4. In alternate examples of the present disclosure, method 400 may include more or less blocks than are shown in FIG. 4. In some examples, one or more of the blocks of method 400 may, at certain times, be ongoing and/or may repeat.

Method 400 may start at block 402 at which point a processor, such as processor 140 may: adaptively order an ordered set of regular expressions based on training messages to produce a set of adaptively ordered regular expressions having an adaptive order.

At block 404, processor 140 may determine that a first of the adaptively ordered regular expressions that matches an additional message. At block 406, processor 140 may determine whether a second of the adaptively ordered regular expressions matches the additional message.

At block 408, processor 140 may determine whether the first or the second regular expression has a higher priority in the adaptive order. At block 410, processor 410 may classify the additional message with whichever of the first or the second regular expression has the higher priority.

Figure 5:
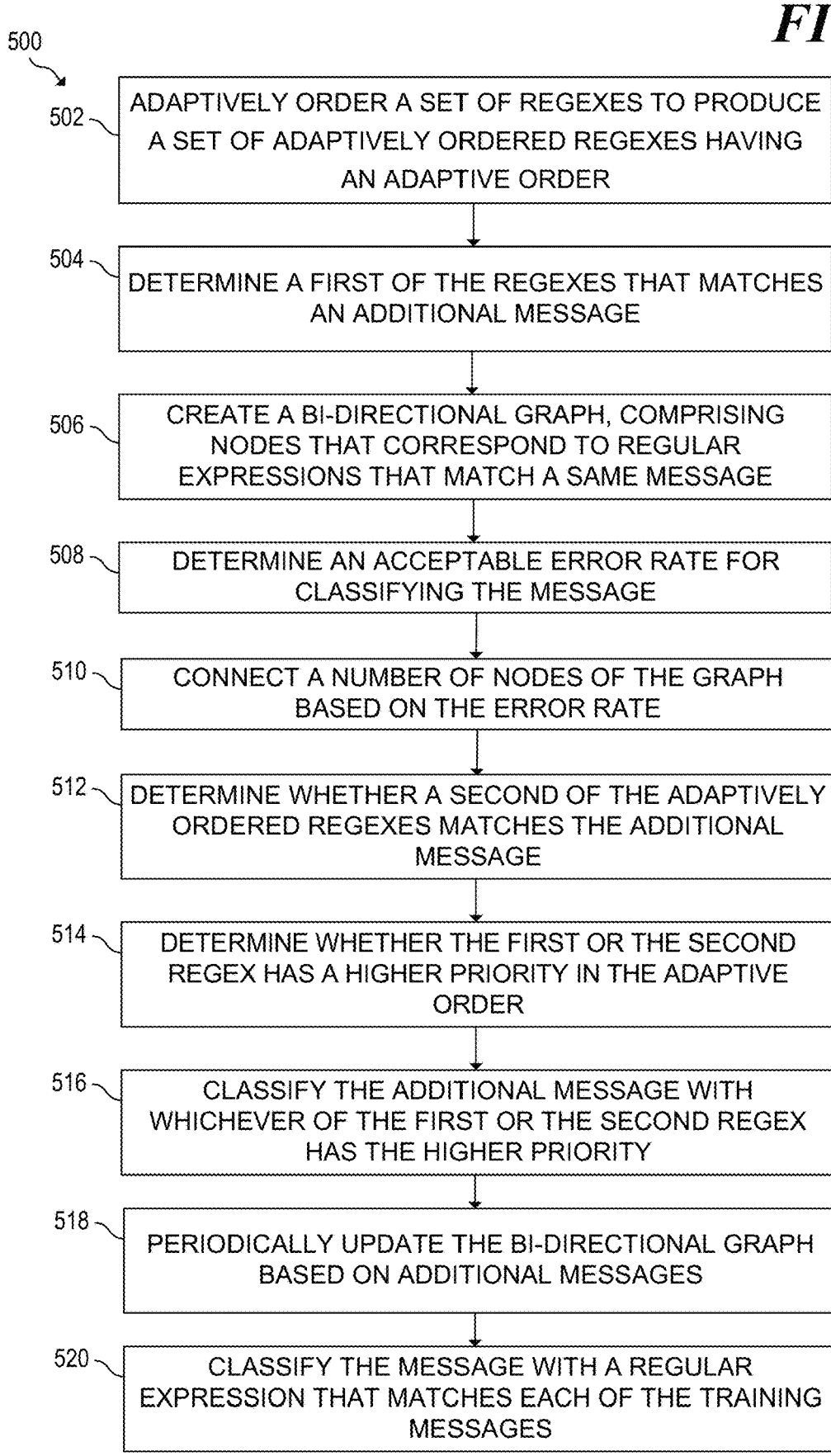
FIG. 5 is a flowchart of another example method for ordering regular expressions.

FIG. 5 is a block diagram of an example flowchart for ordering regular expression. Method 50 may be described below as being executed or performed by a system or device, for example, computing system 100 of FIG. 1 or computing system 200 of FIG. 2. Other suitable systems and/or computing devices may be used as well. Method 500 may be implemented in the form of executable instructions stored on at least one machine-readable storage medium of the system and executed by at least one processor (e.g. processor 140) of the system. Alternatively or in addition, method 500 may be implemented in the form of electronic circuitry (e.g., hardware). In alternate examples of the present disclosure, one or more blocks of method 500 may be executed substantially concurrently or in a different order than shown in FIG. 5. In alternate examples of the present disclosure, method 500 may include more or less blocks than are shown in FIG. 5. In some examples, one or more of the blocks of method 500 may, at certain times, be ongoing and/or may repeat.

Method 500 may start at block 502 at which point a processor, such as processor 140, may adaptively order an ordered set of regular expressions based on training messages to produce a set of adaptively ordered regular expressions having an adaptive order. In various examples, adaptively ordering the ordered regular expressions may comprise determining a frequency that the ordered regular expressions match the training messages, and reordering the ordered expressions based on a frequency that each of the ordered regular expressions matches the training messages to produce the set of adaptively ordered regular expressions.

At block 504, processor 140 may determine that a first of the adaptively ordered regular expressions that matches an additional message. At block 506, processor 140 may create a bi-directional graph, wherein connected nodes of the graph correspond to regular expressions that match a same message, wherein determining whether the second of the adaptively ordered regular expressions matches the additional message comprises: traversing the graph from a first node corresponding to the first regular expression to a second node corresponding to the second regular expression. Processor 140 may further determine that the second regular expression matches the additional message and that the second regular expression has a higher priority in the adaptive order than the first regular expression.

At block 508, processor 140 may determine an acceptable error rate for classifying the message; and at block 510, processor 140 may connect a number of nodes of the bi-directional graph based on the acceptable error rate.

At block 512, processor 140 may determine whether a second of the adaptively ordered regular expressions matches the additional message. At block 514, processor 140 may determine whether the first or the second regular expression has a higher priority in the adaptive order. At block 516, processor 140 may classify the additional message with whichever of the first or the second regular expression has the higher priority.

At block 518, processor 140 may receiving additional messages, and periodically updating the bi-directional graph based on the additional messages. At block 520, processor 140 may determine whether any of the ordered set of regular expressions matches each of the training messages. Responsive to determining that the message does not match any of the training messages, processor 140 may classify the message with one of the any of the regular expressions.

Figure 6:
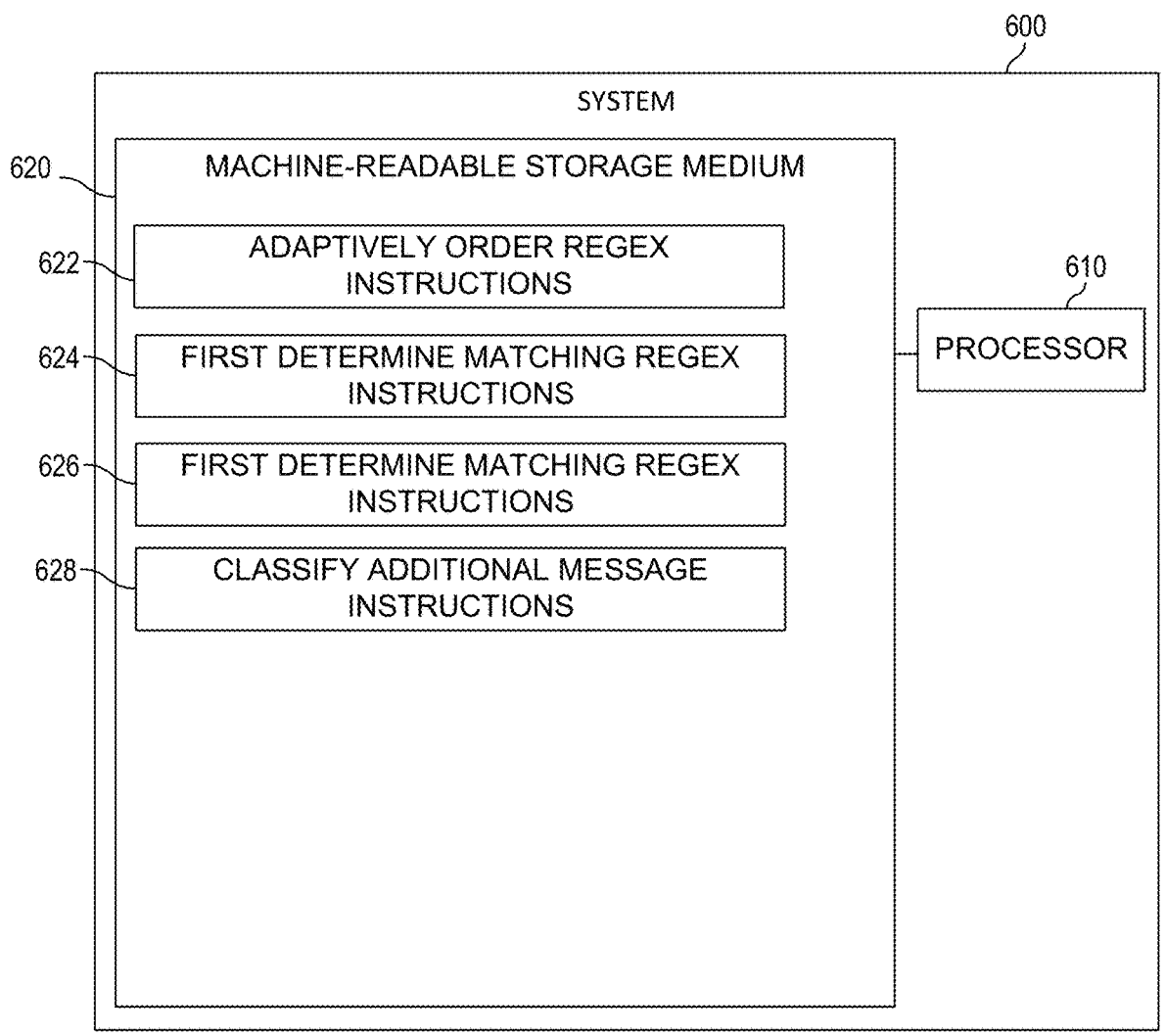
FIG. 6 is a block diagram of an example system for reordering regular expressions.

FIG. 6 is a block diagram of an example system for adaptively ordering regular expressions. System 600 may be similar to system 100 of FIG. 1 or system 200 of FIG. 2, for example. In the example of FIG. 6, system 600 includes a processor 610 and a machine-readable storage medium 620. Storage medium 620 is non-transitory in various examples. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 610 may be one or more central processing units (CPUs), microprocessors, and/or other hardware devices suitable for retrieval and execution of instructions stored in machine-readable storage medium 620. In the particular examples shown in FIG. 6, processor 610 may fetch, decode, and execute instructions 622, 624, 626, 628 to reorder regular expressions. As an alternative or in addition to retrieving and executing instructions, processor 610 may include one or more electronic circuits comprising a number of electronic components for performing the functionality of one or more of the instructions in machine-readable storage medium 620. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 620 may be any electronic, magnetic, optical, or other physical storage device that stores executable instructions. Thus, machine-readable storage medium 620 may be, for example, Random Access Memory (RAM), an Electrically-Erasable Programmable Read-Only Memory (EEPROM), a storage drive, an optical disc, and the like. Machine-readable storage medium 620 may be disposed within system 600, as shown in FIG. 6. In this situation, the executable instructions may be "installed" on the system 600. Alternatively, machine-readable storage medium 620 may be a portable, external or remote storage medium, for example, that allows system 600 to download the instructions from the portable/external/remote storage medium. In this situation, the executable instructions may be part of an "installation package". As described herein, machine-readable storage medium 620 may be encoded with executable instructions to allow reordering of regular expressions, as described above.

Referring to FIG. 6, execute database instructions 622, when executed by a processor (e.g., 610), may cause processor 610 to adaptively order an ordered set of regular expressions based on training messages to produce a set of adaptively ordered regular expressions having an adaptive order.

First determine matching regex instructions 624, when executed, may cause processor 610 to determine a first of the adaptively ordered regular expressions that matches an additional message. Second determine matching regex instructions 626, when executed, may cause processor 610 to determine whether a second of the adaptively ordered regular expressions matches the additional message.

Classify additional message instructions 628, when executed, may cause processor 610 to, responsive to determining that the second of the other of the adaptively ordered regular expressions matches the additional message: classify the additional message with the first regular expression if the first regular expression has a higher priority in the adaptive order, and classify the additional message with the second regular expression if the second regular expression has a higher priority in the adaptive order.

Figure 7:
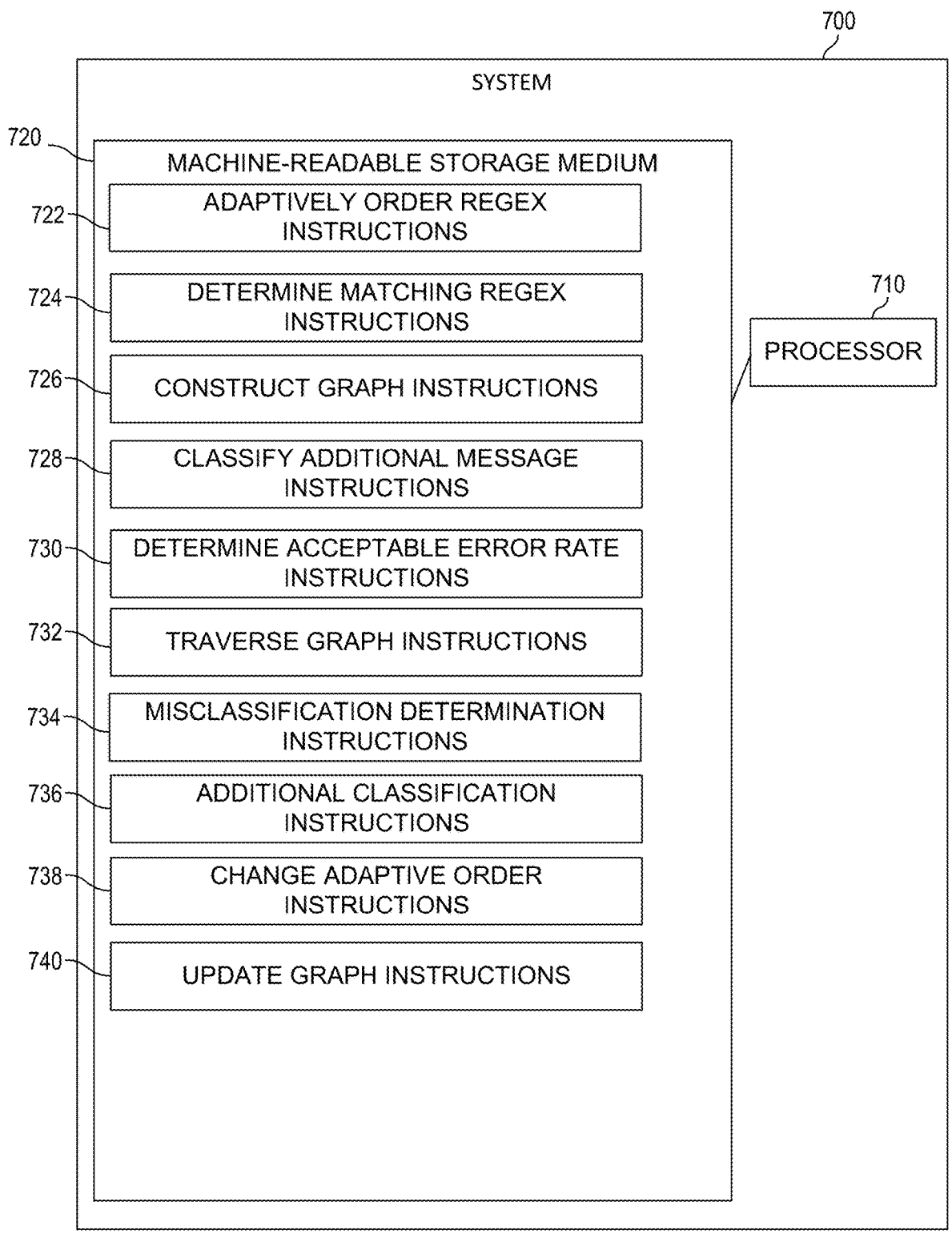
FIG. 7 is a block diagram of an example system for reordering regular expressions.

FIG. 7 is a block diagram of an example system for reordering regular expressions. System 700 may be similar to system 100 of FIG. 1 or system 200 of FIG. 2, for example. In the example of FIG. 7, system 700 includes a processor 710 and a machine-readable storage medium 720. Storage medium 720 is non-transitory in various examples. Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 710 may be one or more central processing units (CPUs), microprocessors, and/or other hardware devices suitable for retrieval and execution of instructions stored in machine-readable storage medium 720. In the particular examples shown in FIG. 7, processor 710 may fetch, decode, and execute instructions 722, 724, 726, 728, 730, 732, 734, 736, 738, 740 to reorder regular expressions.

As an alternative or in addition to retrieving and executing instructions, processor 710 may include one or more electronic circuits comprising a number of electronic components for performing the functionality of one or more of the instructions in machine-readable storage medium 720. With respect to the executable instruction representations (e.g., boxes) described and shown herein, it should be understood that part or all of the executable instructions and/or electronic circuits included within one box may, in alternate examples, be included in a different box shown in the figures or in a different box not shown.

Machine-readable storage medium 720 may be any electronic, magnetic, optical, or other physical storage device that stores executable instructions. Thus, machine-readable storage medium 720 may be, for example, Random Access Memory (RAM), an Electrically-Erasable Programmable Read-Only Memory (EEPROM), a storage drive, an optical disc, and the like. Machine-readable storage medium 720 may be disposed within system 700, as shown in FIG. 7. In this situation, the executable instructions may be "installed" on the system 700. Alternatively, machine-readable storage medium 720 may be a portable, external or remote storage medium, for example, that allows system 700 to download the instructions from the portable/external/remote storage medium. In this situation, the executable instructions may be part of an "installation package". As described herein, machine-readable storage medium 720 may be encoded with executable instructions to allow reordering of regular expressions.

Referring to FIG. 7 adaptively order regex instructions 722, when executed by a processor (e.g., 710), may cause processor 710 to adaptively order an ordered set of regular expressions based on training messages to produce a set of adaptively ordered regular expressions having an adaptive order.

Determine matching regex instructions 724, when executed, may cause processor 710 to determine, for a message of the set of messages, whether a plurality of the adaptively ordered regular expressions match the message.

Construct graph instructions 726, when executed, may cause processor 710 to construct a bi-directional graph that indicates the plurality of regular expressions that match the message.

In various examples, construct graph instructions 726 may comprise instructions that cause processor 710 to: determine a first of the adaptively ordered set of regular expressions that matches the message add a node corresponding to the first regular expression to the graph, determine a second of the adaptively ordered set of regular expressions that matches the message, add a node corresponding to the second of the adaptively ordered regular expressions to the graph, and add, to the graph, an edge from the first node to the second node to indicate that the first regular expression and the second regular expression match the message.

Classify additional message instructions 728, when executed, may cause processor 710 to classify an additional message based on the adaptively ordered set of regular expressions and the bi-directional graph.

Determine additional message instructions 730, when executed, may cause processor 710 to determine a first of the adaptively ordered regular expressions that matches the additional message. Traverse graph instructions 732, when executed, may cause processor 710 to traverse nodes of the graph in an order based on the adaptive order of the adaptively ordered regular expressions.

Misclassification determination instructions 734, when executed, may cause processor 710 to determine that the additional message has been misclassified if a second regular expression corresponding to a node of the bi-directional graph matches the regular expression corresponding to the node and the second regular expression corresponding to the node is ordered higher in the adaptive order than the first regular expression.

Additional classification instructions 736, when executed, may cause processor 710 to determine whether any of the regular expressions matches each of the set of messages, and classify the additional message using the any of the regular expressions after attempting to classify the additional message based on the adaptively ordered set of regular expressions.

Change adaptive order instructions 738, when executed, may cause processor 710 to change the adaptive order based on at least one of: a time of day, or a day of a week. Update graph instructions 740, when executed, may cause processor 710 to receive additional message data, and update the bi-directional graph based on the received additional data.

The invention claimed is:

1. A method performed by a system comprising a hardware processor, the method comprising:
   adaptively ordering an ordered set of regular expressions based on training messages to produce a set of adaptively ordered regular expressions having an adaptive order;
   creating a representation of a graph, wherein connected nodes of the graph correspond to regular expressions that match a same message of the training messages;
   determining a first regular expression of the adaptively ordered regular expressions that matches an additional message;
   traversing the graph from a first node corresponding to the first regular expression to a second node corresponding to a second regular expression of the adaptively ordered regular expressions, and determining whether the second regular expression corresponding to the second node matches the additional message;
   determining whether the first regular expression or the second regular expression has a higher priority in the ordered set of regular expressions; and
   classifying the additional message with whichever regular expression of the first regular expression or the second regular expression has the higher priority.

2. The method of claim 1, wherein the adaptive ordering of the ordered set of regular expressions comprises:
   determining a frequency that each regular expression of the ordered set of regular expressions matches one or more of the training messages; and
   reordering the ordered set of regular expressions into the set of adaptively ordered regular expressions based on the frequencies.

3. The method of claim 1, comprising:
   in response to determining that the first regular expression has the higher priority in the ordered set of regular expressions, classifying the additional message based on the first regular expression; and
   in response to determining that the second regular expression matches the additional message and that the second regular expression has the higher priority in the ordered set of regular expressions, classifying the additional message based on the second regular expression.

4. The method of claim 1, wherein each regular expression of the adaptively ordered regular expressions corresponds to a different node of the graph, wherein an edge from the first node to the second node in the graph indicates that the first regular expression corresponding to the first node matches a same message of the training messages as the second regular expression corresponding to the second node.

5. The method of claim 1, comprising:
   determining an acceptable error rate for classifying a message; and
   connecting a number of nodes of the graph based on the acceptable error rate.

6. The method of claim 1, comprising:
   receiving additional messages; and
   periodically updating the graph based on the additional messages.

7. The method of claim 1, wherein the regular expressions in the ordered set of regular expressions have a priority order that is different from a priority order according to the adaptive order of the regular expressions in the adaptively ordered regular expressions.

8. A system comprising:
   a processor; and
   a non-transitory storage medium storing instructions executable on the processor to:
      adaptively order an ordered set of regular expressions based on training messages to produce a set of adaptively ordered regular expressions having an adaptive order;
      create a representation of a graph comprising a plurality of nodes corresponding to respective regular expressions of the adaptively ordered regular expressions, wherein a first node in the graph is connected to a second node in the graph, and wherein a first regular expression corresponding to the first node and a second regular expression corresponding to the second node match a same message of the training messages;
      determine that the first regular expression of the adaptively ordered regular expressions matches an additional message;
      traverse the graph from the first node to the second node, and determine whether the second regular expression corresponding to the second node matches the additional message;
      responsive to determining that the second regular expression matches the additional message:
         classify the additional message with the first regular expression if the first regular expression has a higher priority than the second regular expression in the ordered set of regular expressions; and
         classify the additional message with the second regular expression if the second regular expression has a higher priority than the first regular expression in the ordered set of regular expressions.

9. The system of claim 8, wherein the instructions are executable on the processor to:
   determine a frequency that each regular expression of the ordered set of regular expressions matches one or more of the training messages; and
   reorder the ordered set of regular expressions into the set of adaptively ordered regular expressions based on the frequencies.

10. The system of claim 8, wherein the regular expressions in the ordered set of regular expressions have a priority order that is different from a priority order according to the adaptive order of the regular expressions in the adaptively ordered regular expressions.

11. The system of claim 8, wherein the graph comprises an edge that connects the first node and the second node.

12. The system of claim 8, wherein the instructions are executable on the processor to:
   determine an acceptable error rate for classifying a message; and
   include a number of connected nodes in the graph based on the acceptable error rate.

13. The system of claim 8, wherein the instructions are executable on the processor to:
   determine whether any of the ordered set of regular expressions matches each of the training messages; and
   responsive to determining that the ordered set of regular expressions does not match any of the training messages:
      classify the additional message with one of the ordered set of regular expressions.

14. A non-transitory machine-readable storage medium comprising instructions that upon execution cause a system to:
   adaptively order an ordered set of regular expressions based on training messages to produce a set of adaptively ordered regular expressions having an adaptive order;
   construct a representation of a graph that represents regular expressions of the adaptively ordered regular expressions;
   determine a first regular expression of the adaptively ordered regular expressions that matches an additional message;
   traverse the graph from a first node corresponding to the first regular expression to a second node corresponding to a second regular expression of the adaptively ordered regular expressions, wherein the first node is connected to the second node in the graph based on the first regular expression and the second regular expression matching a same message of the training messages;
   determine whether the second regular expression corresponding to the second node matches the additional message; and
   responsive to determining that the second regular expression matches the additional message:
      classify the additional message with the first regular expression in response to determining that the first regular expression has a higher priority than the second regular expression in the ordered set of regular expressions; and
      classify the additional message with the second regular expression in response to determining that the second regular expression has a higher priority than the first regular expression in the ordered set of regular expressions.

15. The non-transitory machine-readable storage medium of claim 14, wherein the adaptive ordering of the ordered set of regular expressions comprises adaptively ordering the ordered set of regular expressions based on frequencies that the regular expressions of the ordered set of regular expressions match the training messages.

16. The non-transitory machine-readable storage medium of claim 14, wherein the regular expressions in the ordered set of regular expressions have a priority order that is different from a priority order according to the adaptive order of the regular expressions in the adaptively ordered regular expressions.

17. The non-transitory machine-readable storage medium of claim 14, wherein the instructions upon execution cause the system to:
   determine an acceptable error rate for classifying the additional message; and
   include a number of edges connecting nodes in the graph based on the acceptable error rate.

18. The non-transitory machine-readable storage medium of claim 14, wherein the instructions upon execution cause the system to:
   receive additional messages; and
   update the graph based on the additional messages.

\* \* \* \* \*